United States Patent Office 3,252,820
Patented May 24, 1966

3,252,820
RHEOLOGICAL AGENT FOR ORGANO-BASE SYSTEMS
Robert R. Vignolo, Westfield, Malcolm K. Smith, Mountainside, and Don S. Bolley, Plainfield, N.J., assignors to The Baker Castor Oil Company, Bayonne, N.J., a corporation of New Jersey
No Drawing. Filed Dec. 23, 1964, Ser. No. 420,803
11 Claims. (Cl. 106—272)

This case is a continuation-in-part of our copending application Serial No. 165,943.

The present invention relates to a new rheological agent which can be dispersed in oil-base or solvent-base systems more efficiently and readily than is possible with an existing agent from which it is derived. This new product is especially suited for use in paints being made in modern rapid-dispersion equipment.

While it is obviously a requirement of any quality paint that it yield a durable protective coating, there are other important factors related both to its behavior during manufacture and during application. Most quality paints now contain one or more rheological agents which prevent the settling of pigments during storage, provide excellent leveling and brushing properties and freedom from sagging. Modern paint factories have shifted from the use of grinding equipment, such as three-roll mills, for manufacturing paints, and have gone over to high speed, dispersion-type equipment. This can be done because most pigments now are of such fine particle size that true grinding is no longer necessary, only dispersion of these particles being needed. The much faster dispersion characteristics of the new production equipment require quick and complete dispersion of the thixotropes (rheological agents). However, most thixotropes are quite different in physical and chemical nature from pigments, so difficulties have been encountered in obtaining rapid and complete dispersion.

An object of this invention is to overcome these and other undesirable characteristics of prior rheological agents and provide improved rheological agents to meet the new requirements of the paint industry. Other objects of this invention will be evident from the following specification.

A physically modified form of glyceryl trihydroxystearate (technical grade) has been used for some years as a rheological agent of outstanding performance. This material, hereinafter referred to as "wax powder," is used in the form of a very fine powder, 100% of which passes a #325 sieve, and which contains a large proportion of micron or sub-micron sized particles. In high speed dispersion equipment, common examples of which are Mooney mixer, Cowles dissolver, Hockmeyer mills, etc., this wax powder was found to be difficultly dispersible into oil-base or solvent-base systems such as paints, i.e., it would not disperse as readily or as completely as heretofore it did in paints made with old style equipment. This inadequate performance resulted in extended mixing time required to reach the specified "fineness of grind" (Hegman Scale, ASTM D–1210–54) or failure to reach the desired degree of fineness. Extended mixing time in high speed, high shear dispersers tends to produce excessive temperatures in the paint batch which can have a detrimental effect on the rheological agent.

Intimately incorporating this wax powder by co-grinding therewith a finely divided pigment extender in quantities of about 25% to 75% by weight of the mixture, provides an excellent rheological agent which incorporates readily into the paint mixtures and yields an excellent "fineness of grind" with the high speed dispersion equipment. Any of the finely divided clays, talcs, silicas, etc., commonly used as pigment extenders in paints, and also including titanium dioxide, can be used in combination with the powdered wax to make this improved product. These materials are characterized by particle sizes of one micron or less. Performance of the products seems to vary directly with the amount of pigment extender used, but a 50/50 blend of pigment extender and wax powder appears to give optimum performance.

While the invention is not predicated upon any particular theory, it is believed that the straight wax powder functions as a rheological agent in oil- or solvent-based compositions, such as a paint, by having the individual particles become slightly solvated, soft and swollen to the point where they function as a supporting network for the system. In some paint preparations, either because of the processing schedule or the type of equipment used, the particles in the wax powder are found to be too compact or too close together through some type of association to permit complete dispersion. We believe the addition to said wax powder at the time of manufacture of a selected pigment extender, such as ASP–100 clay (i.e., a water-washed aluminum silicate having average particle size of about 0.5 micron) provides both separation of thixotropic particles to permit easier swelling and gelling, and the action by the pigment extender as an internal grinding mechanism to apply shear where needed.

A specific example of what can be accomplished by the addition of a pigment extender, such as clay powder, to the wax powder, may be seen from a combination in which ASP–100 clay is used. The pigment extender and wax may be heated or melted together prior to grinding or they may be fed simultaneously through the grinding mill and thus be co-ground and intimately mixed. The pigment extender and wax cannot be combined by simple mechanical mixing of these two powders without sacrificing considerable performance compared to the product made by simultaneous manufacture. Any type of grinding mill can be used for comminution of the mixture, provided it reduces the feed stock (pigment extender and wax mixture before co-grinding) to a maximum particle size of about 15 microns with practically all of the product being well below 5 microns in particle size.

Evaluation of the original wax thixotrope and modifications of it may be carried out in the laboratory by use of a special performance formulation which is not in itself a paint. Using the test formulation shown below, improvement in rate and extent of dispersion efficiency is measured by a special test run in a mixer, such as a Waring Blendor. Results obtained in this test have been demonstrated to correlate with subsequent performance in paints processed in production equipment such as the high speed disperser mentioned earlier.

The following formulation was made up:

| | gms. |
|---|---|
| Aroplaz 1266–M–70 (alkyd resins) | 206 |
| Mineral spirits | 274 |
| Calcium octoate (5%) | 13 |
| Thixotrope | 18 |
| | 511 | where Aroplaz is a soya alkyd of the long oil type (other long oil type resins may be used); calcium octoate is a drier to dry the film.

This formulation should produce a smooth liquid having a "fineness of grind" of 7, which should be obtained with five minutes or less of mixing. The measure of about 7 as a minimum on this scale is a criterion for a satisfactory product. Batches prepared according to this formulation are charged to a standard blendor, such as a Waring Blendor operated at 15,000 r.p.m. Samples are removed at 1 minute intervals and tested for "fineness of grind" as a measure of the rate of dispersion. The following table shows the substantial improvement imparted to the regular wax powder by the incorporation of equal co-ground amounts of ASP-100 clay, as described herein:

Table I

"FINENESS OF GRIND" (HEGMAN SCALE)

| Time Mins. | Wax Powder (Without Clay) | Wax/Clay Blend | Wax/Clay Cogrind |
|---|---|---|---|
| 1 | 3.5 | 3.5 | 5.0 |
| 2 | 4.0 | 4.0 | 6.5 |
| 3 | 4.5 | 5.0 | 7.5 |
| 4 | 4.5 | 5.5 | 7.5 |
| 5 | 5.0 | 5.5 | 7.5 |
| 6 | 5.0 | 5.5 | 7.5 |
| 7 | 5.5 | 6.0 | 7.5 |

It can readily be seen from the above data that the rheological agent heretofore used was much slower than the new co-ground product in developing improved "fineness of grind" and it never did reach the desired minimum of 7 within the five-minute period required by the current dispersion equipment used today. Although mechanical blending of clay and wax powder showed slight improvement over the straight wax powder, this improvement was significantly inferior to that obtained with the co-grind technique.

When these same three thixotropic additives were used in a house paint processed through commercial dispersing equipment, the following "fineness of grinds" were obtained: 0, wax powder; 7, wax-clay co-grind; 5+ wax/clay blend. Thus, on a production scale the superior performance of the wax/clay co-grind rheological agent was confirmed.

In another commercial demonstration showing the superior thixotrope of this invention, a co-ground wax/clay powder was used to improve a caulking compound. This was made in a dough mixer where the straight wax powder had previously failed to function. With the improved rheological agent, excellent dispersion was obtained as demonstrated by the finished product being a caulking compound with excellent sag control and no tendency to slump.

Various pigment extenders may be employed to produce the products and use the process taught by this application. Representative of the types that may be used are a water washed aluminum silicate having an average particle size of about 0.5 micron; pure silica of essentially spherical shape; montmorillonite; and titanium dioxide. Montmorillonite is especially effective if it has been amined-treated.

Using the formulation and procedures of Table I, the following table shows the substantial improvement imparted to the regular wax powder by incorporating equal amounts of various types of pigment extenders.

Table II

"FINENESS OF GRIND" (HEGMAN SCALE)

| Time Mins. | Wax Powder (w/o pigment) | Wax Co-grind with (a) | Wax Co-grind with (b) | Wax Co-grind with (c) |
|---|---|---|---|---|
| 1 | 3.5 | 5.0 | 4.0 | 5.0 |
| 2 | 4.0 | 5.0 | 4.0 | 5.0 |
| 3 | 3.5 | 5.5 | 4.5 | 5.5 |
| 4 | 4.5 | 5.5 | 5.0 | 5.5 |
| 5 | 5.0 | 6.5 | 5.5 | 6.0 |
| 6 | 5.0 | 6.5 | 6.0 | 6.5 |
| 7 | 5.5 | 7.0 | 6.5 | 7.0 |

(a) Pure silica of essentially spherical shape.
(b) Amine-treated montmorillonite.
(c) Titanium dioxide.

The above data of Table II shows the co-ground wax and pigment extenders provided a materially improved "fineness of grind."

The ability of clay to improve the dispersion of a wax powder has been demonstrated in another example where the glyceryl trihydroxystearate is combined with N,N'-ethylene bis-12-hydroxystearamide. As in the previous case, this wax, when used as a rheological agent, is in the form of an extremely finer powder. Although it would be an effective rheological agent alone, this particular wax power is even more difficult to disperse in paints than the product previously described. It is almost impossible within working limits to secure a "fineness of grind" reading of 7. However, when this amide wax was co-ground with an equal amount of ASP-100 clay, the dispersion test gave the following results which was commercially acceptable:

Table III

"FINENESS OF GRIND" (HEGMAN SCALE)

| Time Mins. | Wax Powder | Wax/Clay Co-grind |
|---|---|---|
| 1 | 4.0 | 5.0 |
| 2 | 4.5 | 6.0 |
| 3 | 5.0 | 6.0 |
| 4 | 5.0 | 6.0 |
| 5 | 5.0 | 6.5 |
| 6 | 5.0 | 6.5 |
| 7 | 5.0 | 6.5 |

Again, it is shown that incorporation of clay by cogrinding with the wax gives a rheological agent which disperses more readily and completely than the wax powder without the clay.

Other hydroxystearate amides can be combined with glyceryl trihydroxystearate to form waxes. Co-grinding a pigment extender with these waxes produces rheological agents with improved rates of dispersion similar to the results obtained in Table III. The following are illustrative of other hydroxystearate amides which are useful: tetraethylene pentamide of hydroxystearic acid, triethylene tetramide of hydroxystearic acid, diethylene triamide of hydroxystearic acid, imino-bis-propylamide of hydroxystearic acid.

While certain present preferred embodiments of the invention have been illustrated and described, it is to be understood the invention may be otherwise embodied within the spirit thereof, within the scope of the accompanying claims.

What is claimed is:

1. A rheological composition consisting essentially of a co-ground mixture of a thixotropic wax powder and a finely divided pigment extender, said pigment extender being present in an amount between about 25% to about 75% by weight of the mixture, and said thixotropic wax powder being selected from the class consisting of a physically modified form of glyceryl trihydroxystearate and a mixture of a polyamide of hydroxy stearic acid with glyceryl trihydroxystearate.

2. A rheological composition according to claim 1 wherein the thixotropic wax powder is a physically modified form of glyceryl trihydroxystearate.

3. A rheological composition according to claim 1 wherein the thixotropic wax powder is a mixture of glyceryl trihydroxystearate and N,N'-ethylene bis-12-hydroxystearamide.

4. A rheological composition according to claim 1 wherein the pigment extender is selected from the class consisting of aluminum silicate, silica, montmorillonite and titanium dioxide.

5. A rheological composition according to claim 4 wherein the pigment extender is aluminum silicate.

6. A rheological composition according to claim 5 in which the original particle size of many particles of the combination of aluminum silicate and the thixotropic wax powder before simultaneous comminution was at least about 15 microns and the average particle size of the co-ground combination is less than about 5 microns.

7. A rheological composition consisting essentially of a co-ground mixture of a physically modified form of glyceryl trihydroxystearate and aluminum silicate, said aluminum silicate being present in an amount between about 25% to about 75% by weight of the mixture.

8. A paint formulation containing a rheological composition consisting essentially of a co-ground mixture of about 75% to about 25% by weight of glyceryl trihydroxystearate and about 25% to about 75% by weight of aluminum silicate.

9. A paint formulation containing a rheological composition consisting essentially of a co-ground mixture of about 75% to about 25% by weight of a mixture of glyceryl trihydroxystearate with N,N'-ethylene bis-12-hydroxystearamide and about 25% to about 75% by weight of aluminum silicate.

10. A rheological composition for rapid dispersion in an oil-base or solvent-base composition consisting essentially of a combination of an aluminum silicate finely comminuted with a difficultly dispersable thioxtropic wax powder selected from the class consisting of glyceryl trihydroxystearate and a mixture of glyceryl trihydroxystearate with a polyamide of hydroxy stearic acid, said wax powder being present in an amount between about 25% and about 75% by weight of the mixture.

11. A composition according to claim 10 in which the average particle size of the aluminum silicate is about 0.5 micron.

References Cited by the Examiner
UNITED STATES PATENTS

| | | | |
|---|---|---|---|
| 2,772,982 | 12/1956 | Kieras | 106—272 |
| 2,777,776 | 1/1957 | Vesce | 106—272 |
| 3,123,488 | 3/1964 | Lindlaw | 106—268 |

ALEXANDER H. BRODMERKEL, *Primary Examiner.*